(12) United States Patent
Jalan et al.

(10) Patent No.: US 9,106,561 B2
(45) Date of Patent: Aug. 11, 2015

(54) CONFIGURATION OF A VIRTUAL SERVICE NETWORK

(71) Applicant: A10 Networks, Inc., San Jose, CA (US)

(72) Inventors: Rajkumar Jalan, Saratoga, CA (US); Gurudeep Kamat, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 269 days.

(21) Appl. No.: 13/716,128

(22) Filed: Dec. 15, 2012

(65) Prior Publication Data

US 2014/0169168 A1    Jun. 19, 2014

(51) Int. Cl.
*H04L 12/803* (2013.01)
*H04L 12/46* (2006.01)
*H04L 12/721* (2013.01)

(52) U.S. Cl.
CPC .......... *H04L 47/125* (2013.01); *H04L 12/4641* (2013.01); *H04L 45/38* (2013.01)

(58) Field of Classification Search
CPC .................................................. H04L 47/125
USPC .......... 370/235, 389, 397, 400, 428; 709/206, 709/225, 226, 241
See application file for complete search history.

(56) References Cited

U.S. PATENT DOCUMENTS

| | | | |
|---|---|---|---|
| 5,935,207 A | 8/1999 | Logue et al. | |
| 5,958,053 A | 9/1999 | Denker | |
| 6,047,268 A | 4/2000 | Bartoli et al. | |
| 6,219,706 B1 | 4/2001 | Fan et al. | |
| 6,321,338 B1 | 11/2001 | Porras et al. | |
| 6,748,414 B1 | 6/2004 | Bournas | |
| 6,772,334 B1 | 8/2004 | Glawitsch | |
| 6,779,033 B1 | 8/2004 | Watson et al. | |
| 7,010,605 B1 | 3/2006 | Dharmarajan | |
| 7,076,555 B1 | 7/2006 | Orman et al. | |
| 7,181,524 B1 * | 2/2007 | Lele .............................. | 709/226 |

(Continued)

FOREIGN PATENT DOCUMENTS

| | | |
|---|---|---|
| CN | 1449618 | 10/2003 |
| CN | 1529460 | 9/2004 |

(Continued)

OTHER PUBLICATIONS

Spatscheck et al., "Optimizing TCP Forwarder Performance", IEEE/ACM Transactions on Networking, vol. 8, No. 2, Apr. 2000.

*Primary Examiner* — Brian D Nguyen
*Assistant Examiner* — Toan Nguyen
(74) *Attorney, Agent, or Firm* — Carr & Ferrell LLP

(57) ABSTRACT

Configuration of a virtual service network by a configuring node includes: determining that the virtual service is to be configured; determining a configuration associated with the virtual service and including packet forwarding policies associated with the virtual service, each packet forwarding policy including a virtual service network address and a destination; and sending the packet forwarding policies in the configuration to a network node. The network node: stores the packet forwarding policies; receives a data packet for the virtual service and including a virtual service network address; determines a match between the virtual service network address in the data packet with the virtual service network address in a given packet forwarding policy of the stored packet forwarding policies; obtains a given destination in the given packet forwarding policy; and sends the data packet to a service load balancer associated with the given destination by the network node.

13 Claims, 7 Drawing Sheets

(56) References Cited

U.S. PATENT DOCUMENTS

| | | |
|---|---|---|
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,337,241 B2 | 2/2008 | Boucher et al. |
| 7,370,353 B2 | 5/2008 | Yang |
| 7,391,725 B2 | 6/2008 | Huitema et al. |
| 7,398,317 B2 | 7/2008 | Chen et al. |
| 7,430,755 B1 | 9/2008 | Hughes et al. |
| 7,506,360 B1 | 3/2009 | Wilkinson et al. |
| 7,512,980 B2 | 3/2009 | Copeland et al. |
| 7,533,409 B2 | 5/2009 | Keane et al. |
| 7,552,323 B2 | 6/2009 | Shay |
| 7,673,072 B2 | 3/2010 | Boucher et al. |
| 7,675,854 B2 | 3/2010 | Chen et al. |
| 7,881,215 B1 | 2/2011 | Daigle et al. |
| 7,970,934 B1 | 6/2011 | Patel |
| 8,191,106 B2 | 5/2012 | Choyi et al. |
| 8,312,507 B2 | 11/2012 | Chen et al. |
| 8,813,180 B1 | 8/2014 | Chen et al. |
| 8,826,372 B1 | 9/2014 | Chen et al. |
| 8,897,154 B2 | 11/2014 | Jalan et al. |
| 2002/0032777 A1 | 3/2002 | Kawata et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0138618 A1* | 9/2002 | Szabo .......................... 709/225 |
| 2002/0143991 A1 | 10/2002 | Chow et al. |
| 2002/0194350 A1 | 12/2002 | Lu et al. |
| 2003/0014544 A1 | 1/2003 | Pettey |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0111516 A1 | 6/2004 | Cain |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2005/0009520 A1 | 1/2005 | Herrero et al. |
| 2005/0036501 A1 | 2/2005 | Chung et al. |
| 2005/0102400 A1 | 5/2005 | Nakahara et al. |
| 2005/0125276 A1 | 6/2005 | Rusu |
| 2005/0240989 A1 | 10/2005 | Kim et al. |
| 2005/0249225 A1 | 11/2005 | Singhal |
| 2006/0023721 A1 | 2/2006 | Miyake et al. |
| 2006/0036733 A1 | 2/2006 | Fujimoto et al. |
| 2006/0069804 A1 | 3/2006 | Miyake et al. |
| 2006/0077926 A1 | 4/2006 | Rune |
| 2006/0098645 A1 | 5/2006 | Walkin |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0118881 A1 | 5/2007 | Mitchell et al. |
| 2007/0156919 A1 | 7/2007 | Potti et al. |
| 2007/0185998 A1 | 8/2007 | Touitou et al. |
| 2007/0195792 A1 | 8/2007 | Chen et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1* | 2/2008 | Ervin et al. .................... 370/397 |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0250099 A1 | 10/2008 | Shen et al. |
| 2009/0070470 A1 | 3/2009 | Bauman et al. |
| 2009/0092124 A1 | 4/2009 | Singhal et al. |
| 2009/0106830 A1 | 4/2009 | Maher |
| 2009/0141634 A1 | 6/2009 | Rothstein et al. |
| 2009/0172093 A1 | 7/2009 | Matsubara |
| 2010/0061319 A1 | 3/2010 | Aso et al. |
| 2010/0064008 A1 | 3/2010 | Yan et al. |
| 2010/0083076 A1 | 4/2010 | Ushiyama |
| 2010/0106833 A1 | 4/2010 | Banerjee et al. |
| 2010/0106854 A1 | 4/2010 | Kim et al. |
| 2010/0162378 A1 | 6/2010 | Jayawardena et al. |
| 2010/0217793 A1 | 8/2010 | Preiss |
| 2010/0223630 A1 | 9/2010 | Degenkolb et al. |
| 2010/0228819 A1 | 9/2010 | Wei |
| 2010/0235880 A1 | 9/2010 | Chen et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0333101 A1 | 12/2010 | Pope et al. |
| 2011/0007652 A1 | 1/2011 | Bai |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0060831 A1 | 3/2011 | Ishii et al. |
| 2011/0093522 A1 | 4/2011 | Chen et al. |
| 2011/0145324 A1 | 6/2011 | Reinart et al. |
| 2011/0153834 A1 | 6/2011 | Bharrat |
| 2011/0185073 A1 | 7/2011 | Jagadeeswaran et al. |
| 2011/0191773 A1 | 8/2011 | Pavel et al. |
| 2011/0276982 A1 | 11/2011 | Nakayama et al. |
| 2011/0289496 A1 | 11/2011 | Steer |
| 2011/0302256 A1* | 12/2011 | Sureshchandra et al. ..... 709/206 |
| 2012/0084419 A1 | 4/2012 | Kannan et al. |
| 2012/0144015 A1 | 6/2012 | Jalan et al. |
| 2012/0173759 A1* | 7/2012 | Agarwal et al. ................ 709/241 |
| 2012/0290727 A1 | 11/2012 | Tivig |
| 2013/0100958 A1 | 4/2013 | Jalan et al. |
| 2013/0136139 A1 | 5/2013 | Zheng et al. |
| 2013/0166762 A1 | 6/2013 | Jalan et al. |
| 2014/0258536 A1 | 9/2014 | Chiong |
| 2014/0269728 A1 | 9/2014 | Jalan et al. |
| 2014/0330982 A1 | 11/2014 | Jalan et al. |
| 2015/0039671 A1 | 2/2015 | Jalan et al. |

FOREIGN PATENT DOCUMENTS

| | | |
|---|---|---|
| CN | 1575582 | 2/2005 |
| CN | 1725702 | 1/2006 |
| CN | 101094225 | 12/2007 |
| CN | 104040990 | 9/2014 |
| CN | 104067569 | 9/2014 |
| CN | 104106241 | 10/2014 |
| CN | 104137491 | 11/2014 |
| EP | 1209876 A2 | 5/2002 |
| EP | 1770915 A1 | 4/2007 |
| EP | 1885096 A1 | 2/2008 |
| EP | 2772026 | 9/2014 |
| JP | 2014-143686 | 8/2014 |
| KR | 10-0830413 B1 | 5/2008 |
| WO | 01/13228 A2 | 2/2001 |
| WO | 2001049770 A2 | 4/2011 |
| WO | 2011149796 A2 | 12/2011 |
| WO | 2012075237 A2 | 6/2012 |
| WO | 2013070391 A1 | 5/2013 |
| WO | 2013081952 A1 | 6/2013 |
| WO | 2013096019 A1 | 6/2013 |
| WO | 2014138483 | 9/2014 |
| WO | 2014144837 | 9/2014 |
| WO | WO 2014179753 | 11/2014 |

* cited by examiner

CONFIGURATION OF A VIRTUAL SERVICE NETWORK

CROSS-REFERENCE TO RELATED APPLICATIONS

The present application is related to U.S. patent application Ser. No. 13/706,363, filed on Dec. 6, 2012, and is incorporated by reference herein in its entirety.

BACKGROUND OF THE INVENTION

1. Field

This invention relates generally to data communications, and more specifically, to a virtual service network.

2. Background

Service load balancers such as server load balancers or application delivery controllers typically balance load among a plurality of servers providing network services such as Web documents, voice calls, advertisements, enterprise applications, video services, gaming, or consuming broadband services. A service is used by many client computers. Some services are offered for few clients and some services are offered to many clients. Typically a service is handled by a service load balancer. When there are many clients utilizing the service at the same time, the service load balancer will handle the distribution of client service accesses among the servers. However, as the capacity of the service load balancer is reached, a network administrator cannot easily add a second service load balancer, since a service is typically assigned to an IP address of the service load balancer. Adding another service load balancer having the same IP address for the service is not possible in a data network. Network nodes in the data network would not be able to determine which service load balancer to send a client service access to.

The scaling of service demand has not been a problem in the past as computing capacity of service load balancer was able to keep up with client service demand. However, as mobile computing becomes pervasive and as more traditional non networking services such as television, gaming, and advertisement are migrating to data networks, the demand for client services has surpassed the pace of processing improvement. The need to scale to a plurality of service load balancers to support a network service is imminent.

BRIEF SUMMARY OF THE INVENTION

According to one embodiment of the present invention, a method for configuring a virtual service network, the virtual service network comprising a network node and a plurality of service load balancers serving a virtual service associated with a virtual service network address, comprises: (a) determining by a configuring node that the virtual service is to be configured; (b) determining a configuration associated with the virtual service by the configuring node, the configuration further comprising one or more packet forwarding policies associated with the virtual service, each packet forwarding policy comprising a virtual service network address and a destination; and (c) sending the packet forwarding policies in the configuration to the network node, wherein the network node: (c1) stores the packet forwarding policies; (c2) receives a data packet for the virtual service, the data packet comprising a virtual service network address; (c3) determines a match between the virtual service network address in the data packet with the virtual service network address in a given packet forwarding policy of the stored packet forwarding policies; (c4) obtains a given destination in the given packet forwarding policy by the network node; and (c5) sends the data packet to a service load balancer associated with the given destination by the network node.

In one aspect of the present invention, the method further comprises: (d) determining by the configuring node whether the configuration of the virtual service network for the virtual service is to be changed according to a condition criteria comprised in a second configuration associated with the virtual service, the second configuration further comprising one or more second packet forwarding policies; (e) in response to determining that the configuration of the virtual service network for the virtual service is to be changed according to the condition criteria, sending the second packet forwarding policies in the second configuration to the network node, wherein the network node replaces the stored packet forwarding policies with the second packet forwarding policies.

In one aspect of the present invention, the condition criteria comprise one or more of the following: time; a condition of one or more of the service load balancers; or availability of the service load balancers to serve the virtual service.

In one aspect of the present invention, the sending (e) comprises: (e1) in response to determining that the configuration of the virtual service network for the virtual service is to be changed according to the condition criteria, causing the network node to remove the stored packet forwarding policies; and (e2) sending the second packet forwarding policies in the second configuration to the network node.

In one aspect of the present invention, the service load balancers serve a first virtual service and a second virtual service, wherein the configuring node comprises a first configuration associated with a first virtual service and a second configuration associated with a second virtual service, the first configuration comprising a first condition criteria and one or more first packet forwarding policies, the second configuration comprising a second condition criteria and one or more second packet forwarding policies, wherein the method further comprises: (d) determining by the configuring node whether the configuration of the virtual service network for the first virtual service or the second virtual service is to be changed according to the first condition criteria or the second condition criteria; (e) in response to determining that the configuration of the virtual service network for the first virtual service is to be changed according to the first condition criteria, sending the first packet forwarding policies in the first configuration to the network node, wherein the network node replaces stored packet forwarding policies associated with the first virtual service with the first packet forwarding policies; and (f) in response to determining that the configuration of the virtual service network for the second virtual service is to be changed according to the second condition criteria, sending the second packet forwarding policies in the second configuration to the network node, wherein the network node replaces stored packet forwarding policies associated with the second virtual service with the second packet forwarding policies.

According to another embodiment of the present invention, a method for configuring a virtual service network, the virtual service network comprising a network node and a plurality of service load balancers serving a virtual service associated with a virtual service network address, comprises: (a) receiving by the network node one or more packet forwarding policies associated with the virtual service from a configuring node, the configuring node being coupled to the virtual service network, each of the packet forwarding policies comprising a virtual service network address and a destination; (b) storing by the network node the packet forwarding policies; (c) receiving a data packet for the virtual service, the data packet comprising a virtual service network address; (d) comparing by the network node the virtual service network address in the data packet with the virtual service network address in one or more of the stored packet forwarding policies; (e) in response to finding a match between the virtual service network address in the data packet with the virtual service network address in a given packet forwarding policy, determining a given destination in the given packet forwarding policy by the network node; and (f) sending the data packet to a service load balancer associated with the given destination by the network node.

In one aspect of the present invention, the method further comprises: (g) receiving by the network node one or more second packet forwarding policies associated with the virtual service from the configuring node, each of the second packet forwarding policies comprising a second virtual service network address and a second destination; (h) storing by the network node the second packet forwarding policies, wherein the second packet forwarding policies replace the stored packet forwarding policies; (i) receiving a second data packet for the virtual service, the second data packet comprising a second virtual service network address; (j) comparing by the network node the second virtual service network address in the second data packet with the second virtual service network address in one or more of the stored second packet forwarding policies; and (k) in response to finding a match between the second virtual service network address in the second data packet with the second virtual service network address in a given second packet forwarding policy, determining a given second destination in the given second packet forwarding policy by the network node; and (l) sending the second data packet to a second service load balancer associated with the given second destination by the network node.

System and computer program products corresponding to the above-summarized methods are also described and claimed herein.

DETAILED DESCRIPTION OF THE INVENTION

Figure 1:
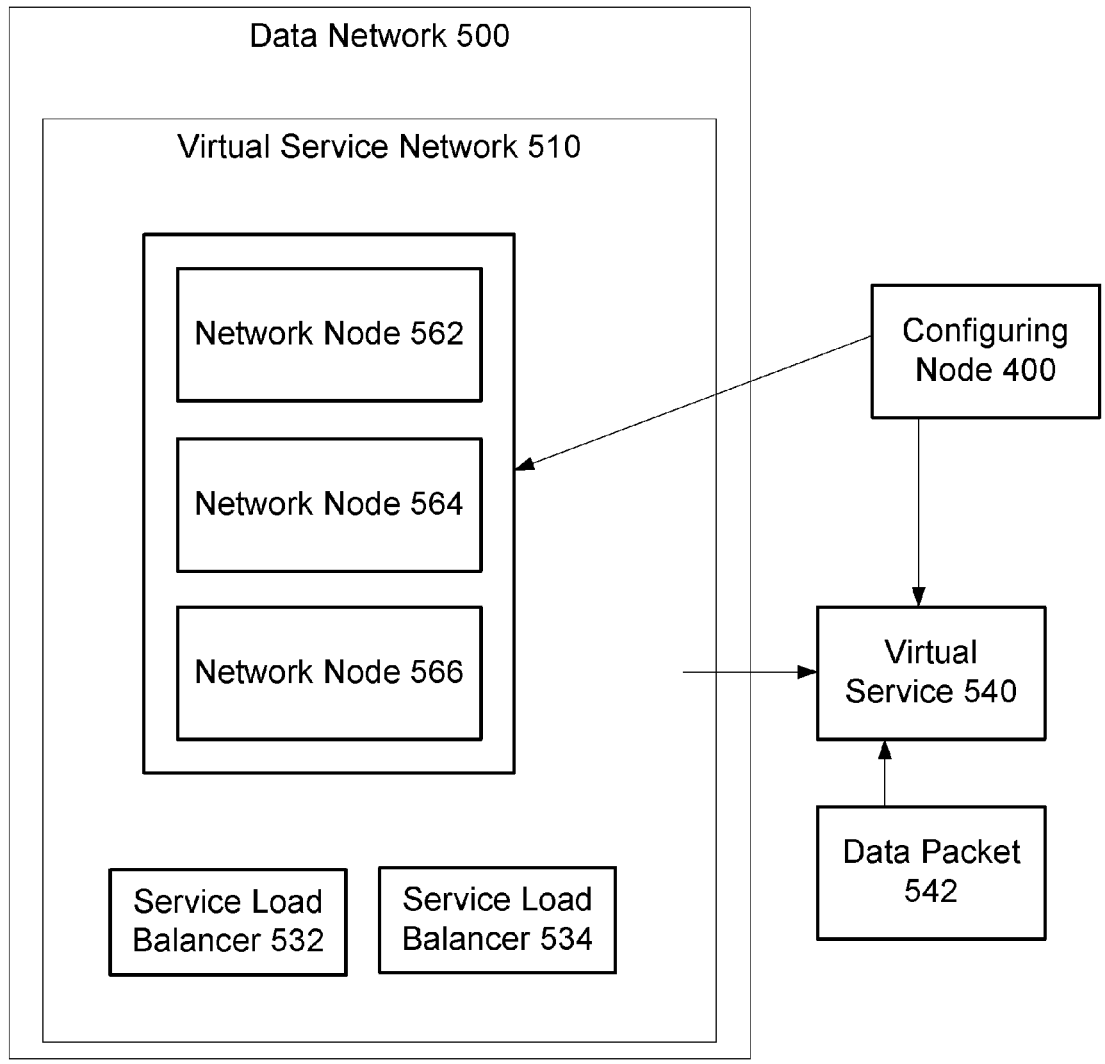
FIG. 1 illustrates a virtual service network with a configuring network node according to an embodiment of the present invention.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates a virtual service network 510 configured for a virtual service 540 according to an embodiment of the present invention. Virtual service network 510 includes one or more network nodes such as network node 562, network node 564 and network node 566. Virtual service network 510 further includes a plurality of service load balancers such as service load balancer 532, and service load balancer 534. Network nodes 562, 564 and 566 are configured by configuring node 400 to handle virtual service 540 such that the network nodes can forward a data packet 542 for virtual service 540 to service load balancers 532 and 534. Service load balancers 532 and 534 process data packet 542 for virtual service 540.

In some embodiments virtual service 540 includes a Web service, a HTTP service, a FTP service, a file transfer service, a video or audio streaming service, an app download service, an advertisement service, an on-line game service, a document access service, a conferencing service, a file sharing service, a group collaboration service, a database access service, an on-line transaction service, a Web browsing service, a VOIP service, a notification service, a messaging service, or an Internet data communication service. In one embodiment, virtual service 540 is associated to a network address which may include an IP address and optionally a transport layer address. In one embodiment, virtual service 540 is associated with an URL.

In one embodiment, virtual service network 510 is configured over a data network 500. In this embodiment, the network nodes and the service load balancers are parts of data network 500. In one embodiment, network node 562 connects directly to service load balancer 532 and configuring node 400 may configure network node 562 to forward data packet 542 directly to service load balancer 532. In one embodiment, network node 562 connects to network node 564, which connects to service load balancer 532. Configuring node 400 may configure network node 562 to forward data packet 542 to network node 564, and may configure network node 564 to forward data packet 542 to service load balancer 532. In one embodiment, network node 562 connects to network node 564 indirectly through one or more network elements in data network 500. In one embodiment, network node 564 connects to service load balancer 532 through another network element in data network 500, or through network node 566 of virtual service network 510.

In one embodiment, data network 500 includes an Internet Protocol (IP) network, a corporate data network, a regional corporate data network, an Internet service provider network, a residential data network, a wired network such as Ethernet, a wireless network such as a WiFi network, or a cellular network. In one embodiment, data network 500 resides in a data center, or connects to a network or application network cloud.

In one embodiment, network node 562 includes the functionality of a network switch, an Ethernet switch, an IP router, an ATM switch, a stackable switch, a broadband remote access system (BRAS), a cable head-end, a mobile network gateway, a home agent gateway (HA-Gateway), a PDSN, a GGSN, a broadband gateway, a VPN gateway, a firewall, or a networking device capable of forwarding packets in data network 500.

In some embodiments, service load balancer 534 includes functionality of a server load balancer, an application delivery controller, a service delivery platform, a traffic manager, a security gateway, a component of a firewall system, a component of a virtual private network (VPN), a load balancer for video servers, a gateway to distribute load to one or more servers, or a gateway performing network address translation (NAT).

In one embodiment, configuring node 400 connects to data network 500 in order to communicate with the network nodes. In one embodiment, configuring node 400 communicates with the network nodes through another data network different than data network 500.

Figure 1A:
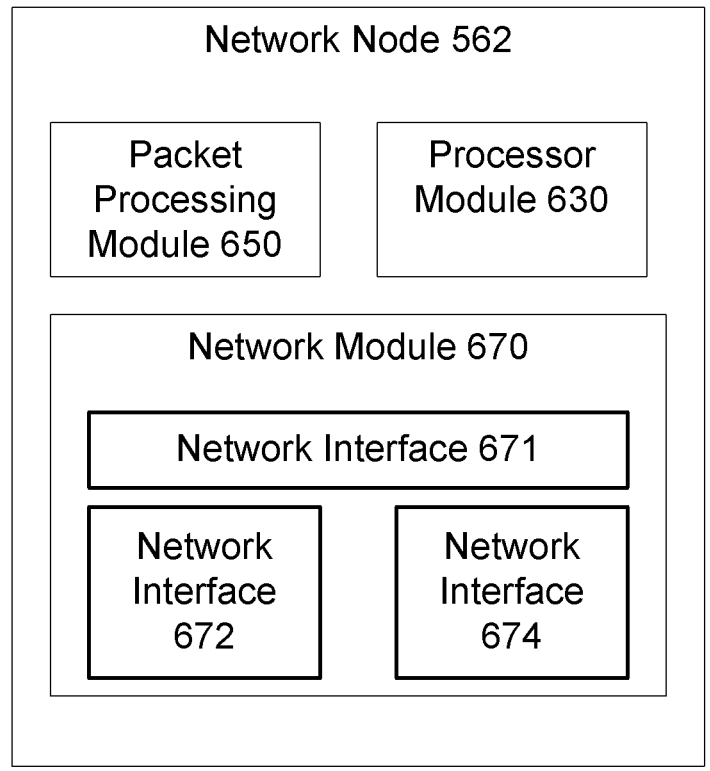
FIGS. 1a-b illustrate components of configuring node and network node according to an embodiment of the present invention.

In one embodiment illustrated in FIG. 1a according to one embodiment of the present invention, network node 562 includes processor module 630, packet processing module 650, and network module 670. In one embodiment, processor module 630 includes one or more processors and a computer readable medium storing programming instructions. In one embodiment, processor module 630 includes storage such as random accessible memory (RAM). In one embodiment, packet processing module 650 includes a processor or a network processor capable of processing data packets. In one embodiment, packet processing module 650 is part of processor module 630. In one embodiment, packet processing module 650 is a physical card or module housing a network processor. In one embodiment packet processing module 650 includes storage such as random access memory (RAM), context addressable memory (CAM), tertiary CAM (TCAM), static random access memory (SRAM) or other memory component. In one embodiment, packet processing module 650 includes a plurality of programming instructions. In one embodiment, network module 670 interacts with data network 500 and virtual service network 510 to transmit and receive data packets. In one embodiment, network module 670 includes a plurality of network interfaces such as network interface 671, network interface 672 and network interface 674. In one embodiment, network interface 671 connects to configuring node 400; network interface 672 connects to service load balancer 532; and network interface 674 connects to service load balancer 534. In one embodiment, network interface 671 connects to configuring node 400 and service load balancers 532, 534 and 536. In one embodiment, network interface 671 is an Ethernet, Gigabit Ethernet, 10-Gigabit Ethernet, ATM, MPLS, wireless network, or optical network interface.

Figure 1B:
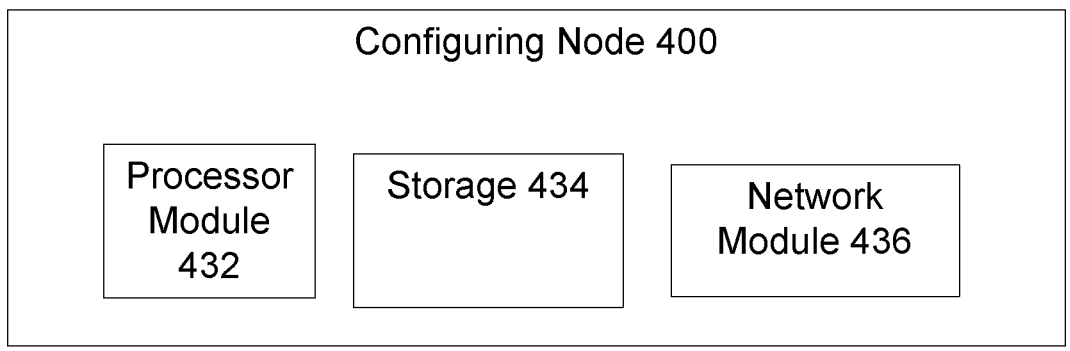

FIG. 1b illustrates a configuring node. In one embodiment, configuring node 400 includes processor module 432, storage 434 and network module 436 according to one embodiment of the present invention. Network module 436 interacts with virtual service network 510 to transmit and receive data packets. In one embodiment, network module 436 exchanges data packets with network node 562. Network module 436 includes a network interface card or network interface module connecting to data network 500 or virtual service network 510. In one embodiment, processor module 432 includes a processor and computer readable medium storing programming instructions, wherein the programming instructions when executed by the processor of processor module 432 implements embodiments of the present invention.

In one embodiment, storage 434 includes a memory module such as random accessible memory (RAM), a hard disk drive, a solid state drive, an external storage device, an optical disk, or a flash drive.

Figure 2:
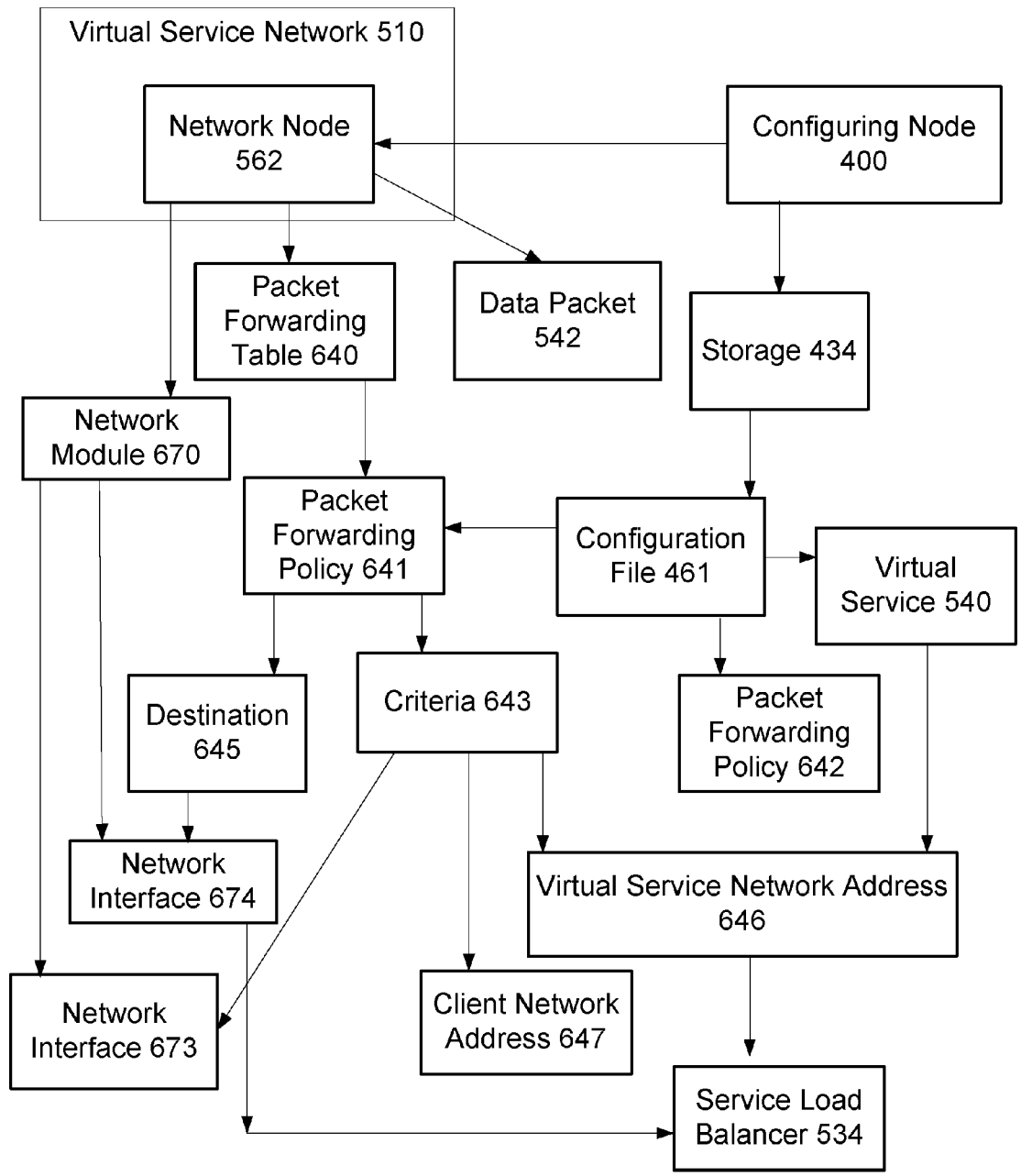
FIG. 2 illustrates a process to configure a virtual service network according to an embodiment of the present invention.

FIG. 2 illustrates a configuring process for virtual service network according to one embodiment of the present invention. In one embodiment, configuring node 400 includes a configuration file 461 associated with the virtual service 540 in storage 434. In one embodiment, configuring node 400 uses configuration file 461 to configure virtual service network 510. Configuration file 461 includes configurations for network nodes 562, 564 and 566. In FIG. 2, an embodiment is illustrated in the context of configuring network node 562. In one embodiment, after configuring node 400 configures network node 562, configuring node 400 configures network nodes 564 and 566.

In one embodiment, configuration file 461 includes a packet forwarding policy 641 for network node 562. Configuring node 400 sends packet forwarding policy 641 to network node 562. In response to receiving the packet forwarding policy 641, network node 562 stores the packet forwarding policy 641 in a packet forwarding table 640 associated with the virtual service. In one embodiment, upon receipt of the packet forwarding policy 641, network node 562 replaces the packet forwarding table 640 with a packet forwarding table comprising the packet forwarding policy 641.

In one embodiment, configuration file 461 includes packet forwarding policy 642. In one embodiment, packet forwarding policy 642 is for network node 562 and configuring node 400 sends packet forwarding policy 642 to network node 562. In one embodiment, packet forwarding policy 642 is not for network node 562, and configuring node 400 does not send packet forwarding policy 642 to network node 562.

In one embodiment, packet forwarding policy 641 includes criteria 643 and destination 645. Destination 645 is associated with network interface 674 of network module 670. In one embodiment, destination 645 is associated with a packet modification process which network node 562 applies to a data packet prior to sending the data packet to network interface 674.

In one embodiment, criteria 643 include client network address 647 and virtual service network address 646. In one embodiment, criteria 643 include network interface 673 where a data packet is to be received. In one embodiment, network module 670 includes network interface 673. Virtual service network address 646 is associated with virtual service 540. In one embodiment, virtual service network address 646 includes the network address of virtual service 540. In one embodiment, virtual service 540 is associated with an URL, and virtual service network address 646 includes a network address corresponding to the URL. In one embodiment, virtual service 540 includes a network address containing an IP address and a transport layer address, and virtual service network address 646 includes the IP address and the transport layer address. In one embodiment, virtual service 540 includes an IP address and virtual service network address 646 includes the IP address and a transport layer address.

In one embodiment, virtual service network address 646 is associated with service load balancer 534, where service load balancer 534 is configured to process a virtual service session using virtual service network address 646.

Destination 645 indicates a transmission process to send a data packet towards service load balancer 534.

In an embodiment, network node 562 receives data packet 542 from network interface 673. Network node 562 obtains source network address and destination address of data packet 542. Network node 562 determines a source network interface 673 from which network node 562 receives data packet 542. Network node 562 retrieves packet forwarding policy 641 from packet forwarding table 640. In one embodiment, network node 562 uses source network interface 673 of data packet 542 to retrieve packet forwarding policy 641, for example by comparing source network interface 673 of data packet 542 against network interface 673 of criteria 643 of packet forwarding policy 641. When there is a match for source network interface 673, network node 562 retrieves packet forwarding policy 641. Network node 562 further matches source network address of data packet 542 against client network address 647 of criteria 643, matches destination network address of data packet 542 against virtual service network address 646 of criteria 643, and finds a match in these two matches.

In one embodiment, client network address 647 of criteria 643 includes an IP address and network node 562 retrieves a source IP address of data packet 542. In one embodiment, client network address 647 includes a transport layer port number or address, and network node 562 retrieves a source transport layer port number or address from data packet 542. In one embodiment, virtual service network address 646 of criteria 643 includes an IP address and network node 562 retrieves a destination IP address of data packet 542. In one embodiment, virtual service network address 646 includes a transport layer port number or address, and network node 562 retrieves a destination transport layer port number or address from data packet 542. In one embodiment, network interface 673 includes a link layer address and network node 562 extracts a link layer address of source network interface of data packet 542. In one embodiment, network interface 673 includes a link layer tag such as VLAN-tag, a MPLS label or other layer 2 identity. Network node 562 obtains the corresponding layer 2 or link layer identity from source network interface of data packet 542 or from data packet 542.

Network node 562 determines data packet 542 satisfies criteria 643, and applies packet forwarding policy 641 to forward data packet 542. Network node 562 sends data packet 542 using destination 645 of criteria 643. In one embodiment, network node 562 sends data packet 542 to network interface 674. In one embodiment, network node 562 modifies data packet 542 based on a data packet modification process included in destination 645, prior to sending modified data packet 542 to network interface 674.

In one embodiment, network node 562 compares virtual service network address 646 against a virtual service network address in data packet 542. In response to determining that the virtual service network address 646 matches the virtual service network address in the data packet 542, the network node 562 determines the destination 645 in the packet forwarding policy 641, and sends the data packet 542 to a service load balancer associated with the destination 645. In one embodiment, criteria 643 include a process to extract the source and destination network addresses of data packet 542.

In one embodiment, configuring node 400 configures other network nodes such as network node 564 using configuration file 461 similar to configuring network node 562.

Figure 3:
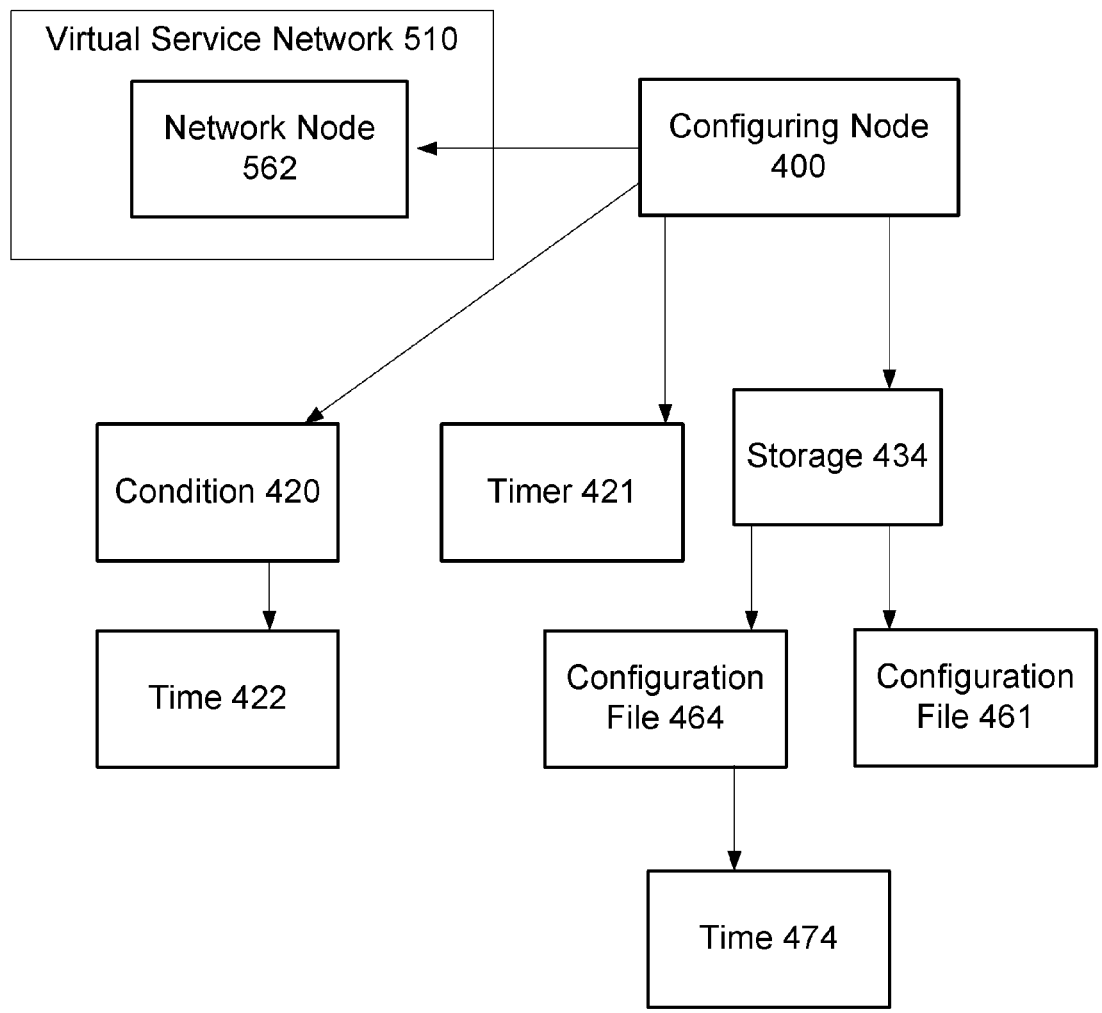
FIG. 3 illustrates a change of configuration for a virtual service network due to a change of time condition according to an embodiment of the present invention.

FIG. 3 illustrates a change of configuration of virtual service network according to one embodiment of the present invention. In one embodiment, configuring node 400 includes configuration file 461 and configuration file 464, both of which are stored in storage 434. Virtual service network 510 is currently configured by configuring node 400 using configuration file 461. Configuring node 400 checks for condition 420 to determine if configuring node 400 should use configuration file 464 to configure virtual service network 510.

In one embodiment, condition 420 is related to time 422, such as a time of day or a date. In this embodiment, configuration file 464 includes time 474. In one embodiment, time 474 is a date such as Jan. 30, 2015; a day of week such as Monday; a time of day such as 8 am, 5 pm, 0830 GMT, or midnight; a day of month such as $1^{st}$, $15^{th}$; or a deadline such as in 60 minutes, in 3 hours, or in 5 minutes. In one embodiment, time 474 includes a recurrence such as every Monday, 8 am every weekday, every $15^{th}$ of a month, every Christmas day, 3 pm of every July 4$^{th}$, every other Tuesday, or February 22$^{nd}$ of every year. In one embodiment, configuring node 400 includes a timer 421 corresponds to time 474. When timer 421 expires, configuring node 400 configures virtual service network 510 using configuration file 464.

In one embodiment, prior to sending packet forwarding policies of configuration file 464 to network node 562, configuring node 400 informs network node 562 to remove all currently configured packet forwarding policies. In one embodiment, configuring node 400 informs network node 562 to remove configured packet forwarding policies from configuration file 461. In one embodiment, network node 562 automatically removes configured packet forwarding policies when network node 562 receives a packet forwarding policy of configuration file 464 from configuring node 400. In one embodiment, network node 562 removes existing configured packet forwarding policies at a later time after network node 562 is configured with a received packet forwarding policy.

In one embodiment, configuration file 464 includes packet forwarding policies for other network nodes of virtual service network 510, configuring node 400 also configures the other network nodes referenced by those packet forwarding policies in configuration file 464.

Figure 4:
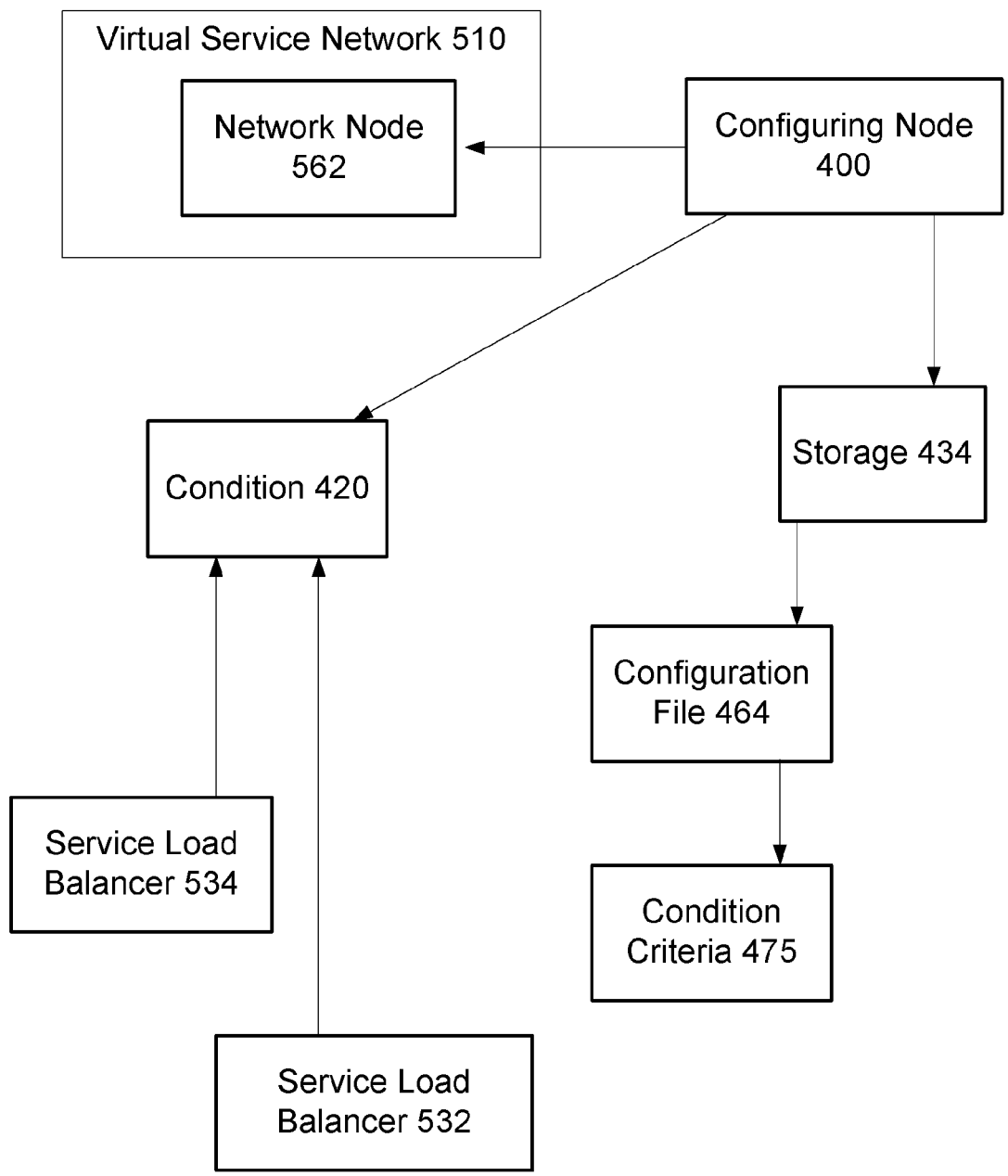
FIG. 4 illustrates a change of configuration for a virtual service network due to a change of service load balancer system condition according to an embodiment of the present invention.

In FIG. 4 according to one embodiment of the present invention, condition 420 relates to a change related to one or more service load balancers. In one embodiment, configuring node 400 receives condition 420 including a condition of service load balancer 532 and a condition of service load balancer 534. In one embodiment, a condition of service load balancer 532 or service load balancer 534 can be a network traffic load, bandwidth utilization, a processing load, memory utilization, a health check, a network performance condition, or a system performance condition of service load balancer 532 or service load balancer 534. Configuration file 464 includes condition criteria 475. Configuring node 400 matches condition 420 with condition criteria 475. If there is a match, configuring node 400 determines to use configuration file 464 to configure virtual service network 510, using a process illustrated in FIG. 3.

Figure 5:
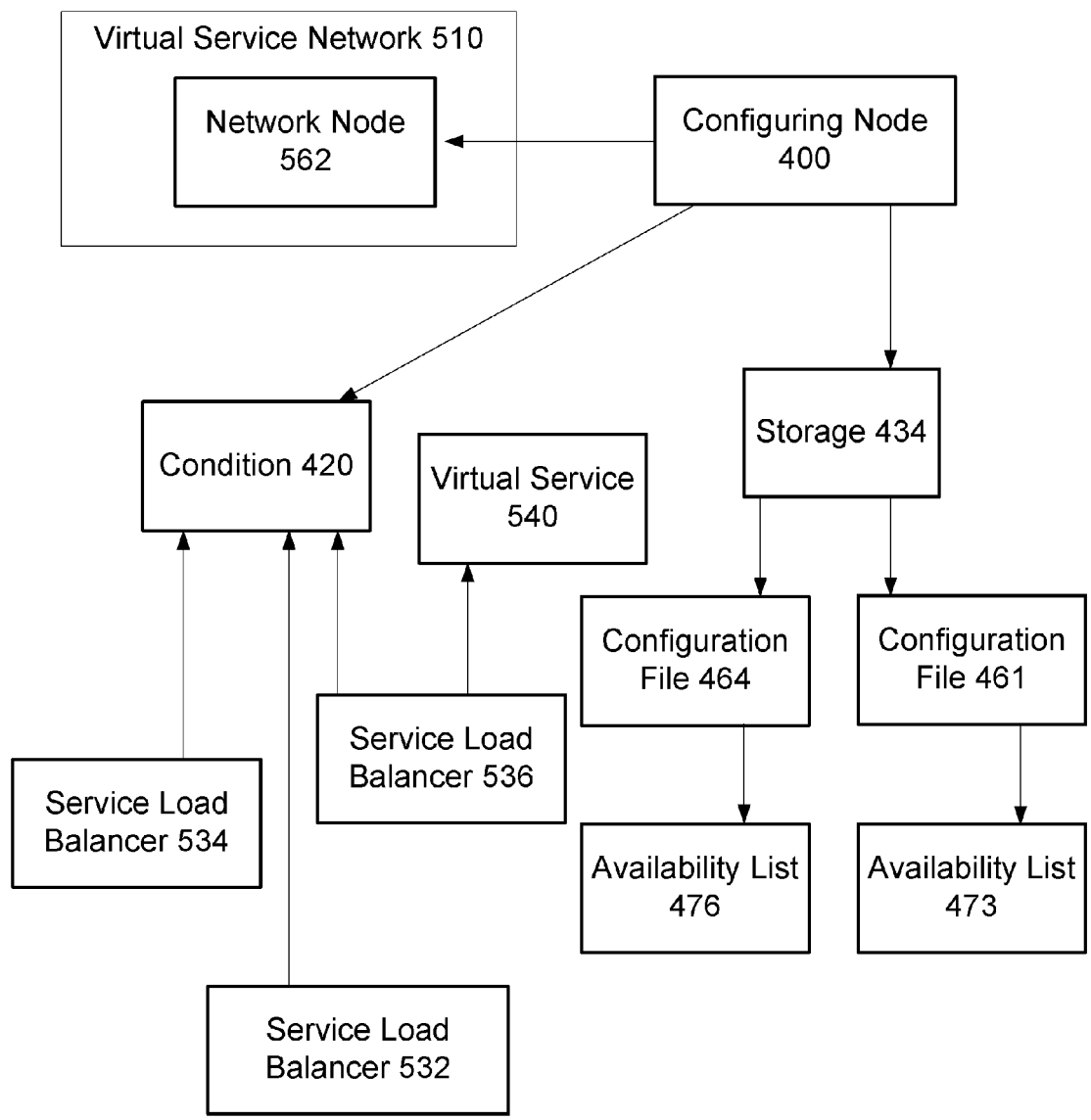
FIG. 5 illustrates a change of configuration for a virtual service network due to an addition or a removal of a service load balancer according to an embodiment of the present invention.

In FIG. 5, condition 420 relates to availability of service load balancers to serve the virtual service 540 according to one embodiment of the present invention. In one embodiment, configuring node 400 receives condition 420 indicating service load balancer 536 becomes available for virtual service 540, in addition to currently available service load balancer 532 and service load balancer 534. In one embodiment, configuration file 464 includes an availability list 476 of service load balancers. Configuring node 400 compares condition 420 and availability list 476 of configuration file 464 and determines to use configuration file 461. Configuring node 400 proceeds to configure virtual service network 510 using configuration file 464. In one embodiment, configuration file 464 includes packet forwarding policies correspond to service load balancer 536.

In one embodiment, condition 420 indicates service load balancer 536 becomes unavailable for virtual service 540. Configuring node 400 matches condition 420 with availability list 473 of configuration file 461, and finds a match. Configuring node 400 uses configuration file 461 to configure virtual service network 510.

Figure 6:
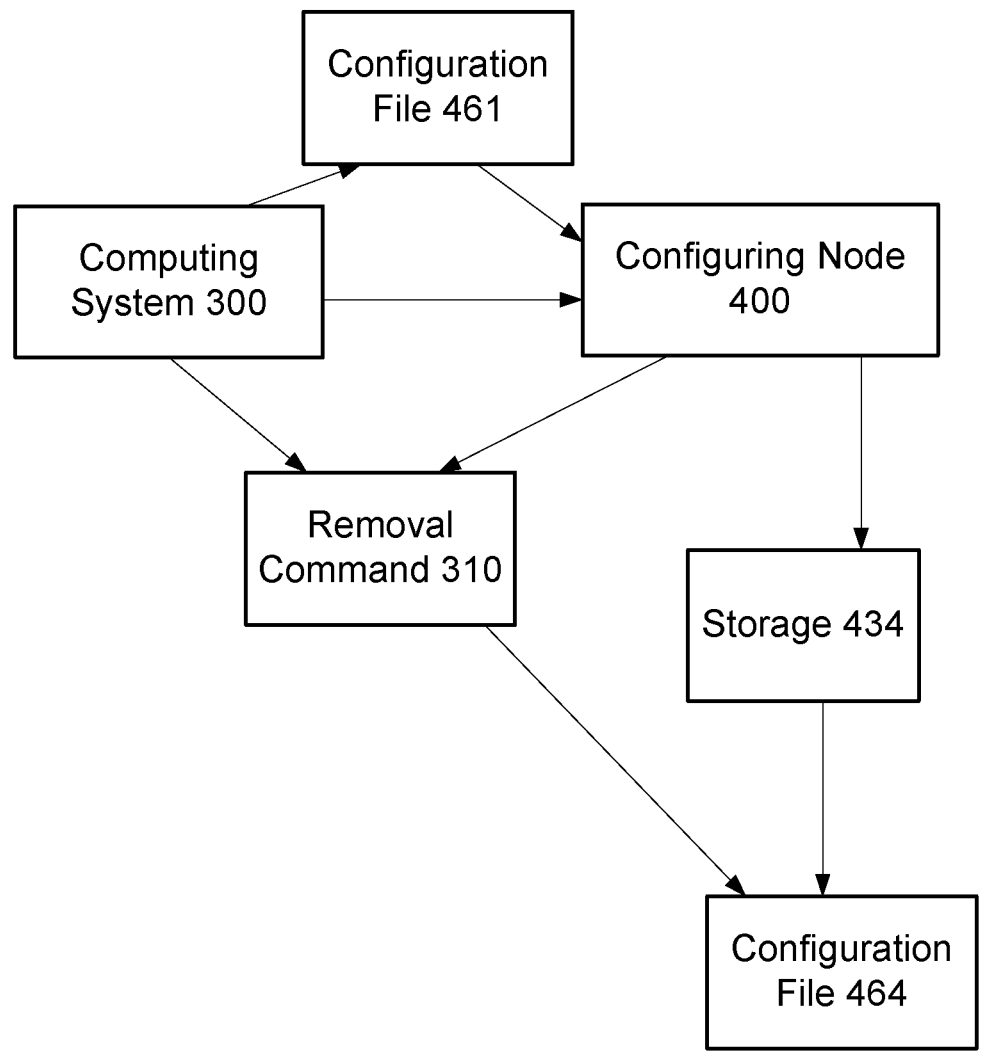
FIG. 6 illustrates a process to manage virtual service network configurations according to an embodiment of the present invention.

FIG. 6 illustrates a process to manage configuration files in configuring node 400 according to one embodiment of the present invention. In one embodiment, configuring node 400 includes a plurality of configuration files comprising configuration files 461 and 464 stored in storage 434. The plurality of configuration files are managed by a computing system 300 such as a network management system, an administration system, a computer in a network operating center, or other network computer. In one embodiment, computing system 300 is a subsystem of configuring node 400. In one embodiment, configuring node 400 receives configuration file 464 from computing system 300. Configuring node 400 stores configuration file 464 into the plurality of configuration files. Configuring node 400 subsequently would use configuration file 464 to configure virtual service network 510, as illustrated in previous embodiments. In one embodiment, configuring node 400 receives a removal command 310 from computing system 300. Removal command 310 includes an identity of configuration file 464. Configuring node 400 matches identity of configuration file 464 against the plurality of configuration files and removes the matching configuration file 464 from the plurality of configuration files.

In one embodiment, computing system 300 generates configuration file 464 through an network administrator, a network architect, a network planner, a network planning software, a piece of software computing the packet forwarding policies for virtual service 540 for virtual service network 510.

In one embodiment, virtual service network 510 includes a second virtual service which is supported by one or more network nodes and one or more service load balancers. In one embodiment, the network nodes and the service load balancers for the second virtual service are the same as those for virtual service 540. In one embodiment, they are not the same. In one embodiment, network node 562 handles packet forwarding policies for virtual service 540 and the second virtual service. In one embodiment, network node 564 handles virtual service 540 but not the second virtual service. In one embodiment, service load balancer 532 services virtual service 540 and the second virtual service. In one embodiment, service load balancer 534 services the second virtual service but not virtual service 540. In one embodiment, configuration file 461 includes packet forwarding policies corresponding to both virtual service 540 and the second virtual service. Configuring node 400 configures virtual service network 510 using configuration file 461, such that virtual service network 510 can handle virtual service 540 and the second virtual service.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for configuring a virtual service network, the virtual service network comprising a network node and a plurality of service load balancers serving a virtual service associated with a virtual service network address, comprising:
   determining by a configuring node that the virtual service is to be configured;
   determining a configuration associated with the virtual service by the configuring node, the configuration comprising one or more packet forwarding policies associated with the virtual service, each packet forwarding policy comprising the virtual service network address and a destination;
   sending the packet forwarding policies in the configuration to a network node, wherein the network node:
   stores the packet forwarding policies;

receives a data packet for the virtual service, the data packet comprising the virtual service network address;

determines a match between the virtual service network address in the data packet with the virtual service network address in a given packet forwarding policy of the stored packet forwarding policies;

obtains a given destination in the given packet forwarding policy; and sends the data packet to a service load balancer associated with the given destination;

determining by the configuring node whether the configuration of the virtual service network for the virtual service is to be changed according to a condition criteria comprised in a second configuration associated with the virtual service, the second configuration further comprising one or more second packet forwarding policies; and in response to determining that the configuration of the virtual service network for the virtual service is to be changed according to the condition criteria, sending the second packet forwarding policies in the second configuration to the network node, wherein the network node replaces the stored packet forwarding policies with the second packet forwarding policies, the sending comprising:

in response to determining that the configuration of the virtual service network for the virtual service is to be changed according to the condition criteria, removing by the network node the stored packet forwarding policies; and sending the second packet forwarding policies in the second configuration to the network node.

2. The method of claim 1, wherein the condition criteria comprise one or more of the following: time; a condition of one or more of the service load balancers; and availability of the service load balancers to serve the virtual service.

3. The method of claim 1, wherein the service load balancers serve a first virtual service and a second virtual service, wherein the configuring node comprises a first configuration associated with the first virtual service and a second configuration associated with the second virtual service, the first configuration comprising a first condition criteria and one or more first packet forwarding policies, the second configuration comprising a second condition criteria and one or more second packet forwarding policies, wherein the method further comprises:

determining by the configuring node whether the configuration of the virtual service network for the first virtual service or the second virtual service is to be changed according to the first condition criteria or the second condition criteria;

in response to determining that the configuration of the virtual service network for the first virtual service is to be changed according to the first condition criteria, sending the first packet forwarding policies in the first configuration to the network node, wherein the network node replaces stored packet forwarding policies associated with the first virtual service with the first packet forwarding policies; and in response to determining that the configuration of the virtual service network for the second virtual service is to be changed according to the second condition criteria, sending the second packet forwarding policies in the second configuration to the network node, wherein the network node replaces stored packet forwarding policies associated with the second virtual service with the second packet forwarding policies.

4. The method of claim 1, wherein the configuration further comprises one or more second packet forwarding policies, wherein the method further comprises:

determining by the configuring node that a second network node of the virtual service network is to be configured for the virtual service; and sending the second packet forwarding policies in the configuration to the second network node.

5. A non-transitory computer-readable storage medium having embodied thereon a program, the program being executable by a processor to perform a method for configuring a virtual service network, the method comprising:

determining by a configuring node that a virtual service is to be configured, the virtual service being associated with a virtual service network address;

determining a configuration associated with the virtual service by the configuring node, the configuration comprising one or more packet forwarding policies associated with the virtual service, each packet forwarding policy comprising the virtual service network address and a destination;

sending the packet forwarding policies in the configuration to a network node, wherein the network node:
  stores the packet forwarding policies;
  receives a data packet for the virtual service, the data packet comprising the virtual service network address;
  determines a match between the virtual service network address in the data packet with the virtual service network address in a given packet forwarding policy of the stored packet forwarding policies;
  obtains a given destination in the given packet forwarding policy; and
  sends the data packet to a service load balancer associated with the given destination;

determining by the configuring node whether the configuration of the virtual service network for the virtual service is to be changed according to a condition criteria comprised in a second configuration associated with the virtual service, the second configuration further comprising one or more second packet forwarding policies; and in response to determining that the configuration of the virtual service network for the virtual service is to be changed according to the condition criteria, sending the one or more second packet forwarding policies in the second configuration to the network node, the network node replacing the stored packet forwarding policies with the one or more second packet forwarding policies, the sending comprising:

in response to determining that the configuration of the virtual service network for the virtual service is to be changed according to the condition criteria, removing by the network node the stored packet forwarding policies; and sending the second packet forwarding policies in the second configuration to the network node.

6. The medium of claim 5, wherein the condition criteria comprise one or more of the following: time; a condition of one or more of the service load balancers; and availability of the service load balancers to serve the virtual service.

7. The medium of claim 5, wherein the service load balancers serve a first virtual service and a second virtual service, wherein the configuring node comprises a first configuration associated with the first virtual service and a second configuration associated with the second virtual service, the first configuration comprising a first condition criteria and one or more first packet forwarding policies, the second configuration comprising a second condition criteria and one or more second packet forwarding policies, wherein the method further comprises:

determining by the configuring node whether the configuration of the virtual service network for the first virtual service or the second virtual service is to be changed according to the first condition criteria or the second condition criteria;

in response to determining that the configuration of the virtual service network for the first virtual service is to be changed according to the first condition criteria, sending the first packet forwarding policies in the first configuration to the network node, wherein the network node replaces stored packet forwarding policies associated with the first virtual service with the first packet forwarding policies; and in response to determining that the configuration of the virtual service network for the second virtual service is to be changed according to the second condition criteria, sending the second packet forwarding policies in the second configuration to the network node, wherein the network node replaces stored packet forwarding policies associated with the second virtual service with the second packet forwarding policies.

8. The medium of claim 5, wherein the configuration further comprises one or more second packet forwarding policies, wherein the method further comprises:

determining by the configuring node that a second network node of the virtual service network is to be configured for the virtual service; and sending the second packet forwarding policies in the configuration to the second network node.

9. A system, comprising:

a virtual service network comprising a network node and a plurality of service load balancers serving a virtual service associated with a virtual service network address; and a configuring node coupled to the virtual service network, the configuring node:

determining that the virtual service is to be configured;

determining a configuration associated with the virtual service, the configuration comprising one or more packet forwarding policies associated with the virtual service, each packet forwarding policy comprising the virtual service network address and a destination;

sending the packet forwarding policies in the configuration to the network node, the network node:

storing the packet forwarding policies;

receiving a data packet for the virtual service, the data packet comprising the virtual service network address;

determining a match between the virtual service network address in the data packet with the virtual service network address in a given packet forwarding policy of the stored packet forwarding policies;

obtaining a given destination in the given packet forwarding policy; and sending the data packet to a service load balancer associated with the given destination;

determining whether the configuration of the virtual service network for the virtual service is to be changed according to a condition criteria comprised in a second configuration associated with the virtual service, the second configuration further comprising one or more second packet forwarding policies; and in response to determining that the configuration of the virtual service network for the virtual service is to be changed according to the condition criteria, sending the one or more second packet forwarding policies in the second configuration to the network node, wherein the network node replaces the stored packet forwarding policies with the one or more second packet forwarding policies, the sending comprising:

in response to determining that the configuration of the virtual service network for the virtual service is to be changed according to the condition criteria, removing by the network node the stored packet forwarding policies; and sending the second packet forwarding policies in the second configuration to the network node.

10. The system of claim 9, wherein the condition criteria comprise one or more of the following: time; a condition of one or more of the service load balancers; and availability of the service load balancers to serve the virtual service.

11. The system of claim 9, wherein the service load balancers serve a first virtual service and a second virtual service, wherein the configuring node comprises a first configuration associated with the first virtual service and a second configuration associated with the second virtual service, the first configuration comprising a first condition criteria and one or more first packet forwarding policies, the second configuration comprising a second condition criteria and one or more second packet forwarding policies, the configuring node further:

determining whether the configuration of the virtual service network for the first virtual service or the second virtual service is to be changed according to the first condition criteria or the second condition criteria;

in response to determining that the configuration of the virtual service network for the first virtual service is to be changed according to the first condition criteria, sending the first packet forwarding policies in the first configuration to the network node, wherein the network node replaces stored packet forwarding policies associated with the first virtual service with the first packet forwarding policies; and in response to determining that the configuration of the virtual service network for the second virtual service is to be changed according to the second condition criteria, sending the second packet forwarding policies in the second configuration to the network node, wherein the network node replaces stored packet forwarding policies associated with the second virtual service with the second packet forwarding policies.

12. The system of claim 9, wherein the configuration further comprises one or more second packet forwarding policies, the configuring node further:

determining that a second network node of the virtual service network is to be configured for the virtual service; and sending the second packet forwarding policies in the configuration to the second network node.

13. A method for configuring a virtual service network, the virtual service network comprising a network node and a plurality of service load balancers serving a virtual service associated with a virtual service network address, comprising:

receiving by the network node one or more packet forwarding policies associated with the virtual service from a configuring node, the configuring node being coupled to the virtual service network, each of the packet forwarding policies comprising the virtual service network address and a destination;
storing by the network node the packet forwarding policies;
receiving a data packet for the virtual service, the data packet comprising the virtual service network address;
comparing by the network node the virtual service network address in the data packet with the virtual service network address in one or more of the stored packet forwarding policies;
in response to finding a match between the virtual service network address in the data packet with the virtual service network address in a given packet forwarding policy, determining a given destination in the given packet forwarding policy by the network node;
sending the data packet to a service load balancer associated with the given destination by the network node;
receiving by the network node one or more second packet forwarding policies associated with the virtual service from the configuring node, each of the second packet forwarding policies comprising a second virtual service network address and a second destination;
storing by the network node the second packet forwarding policies, wherein the second packet forwarding policies replace the stored packet forwarding policies;
receiving a second data packet for the virtual service, the second data packet comprising the second virtual service network address;
comparing by the network node the second virtual service network address in the second data packet with the second virtual service network address in one or more of the stored second packet forwarding policies; and
in response to finding a match between the second virtual service network address in the second data packet with the second virtual service network address in a given second packet forwarding policy, determining a given second destination in the given second packet forwarding policy by the network node; and
sending the second data packet to a second service load balancer associated with the given second destination by the network node.

* * * * *